United States Patent
Adachi

(10) Patent No.: US 7,401,236 B2
(45) Date of Patent: Jul. 15, 2008

(54) PERIPHERAL DEVICE AND ITS CONTROL METHOD ITS MAIN BODY DEVICE AND ITS CONTROL METHOD AND ITS PROGRAM

(75) Inventor: Tatsuya Adachi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 427 days.

(21) Appl. No.: 10/508,906

(22) PCT Filed: Feb. 5, 2004

(86) PCT No.: PCT/JP2004/001225

§ 371 (c)(1),
(2), (4) Date: Sep. 23, 2004

(87) PCT Pub. No.: WO2004/070593

PCT Pub. Date: Aug. 19, 2004

(65) Prior Publication Data

US 2005/0120250 A1    Jun. 2, 2005

(30) Foreign Application Priority Data

Feb. 5, 2003    (JP) .............................. 2003-028557

(51) Int. Cl.
*G06F 1/00* (2006.01)
*G06F 1/32* (2006.01)
(52) U.S. Cl. ...................... 713/300; 713/320
(58) Field of Classification Search ................ 713/300
See application file for complete search history.

(56) References Cited

U.S. PATENT DOCUMENTS 5,812,860 A * 9/1998 Horden et al. .............. 713/322
6,085,982 A * 7/2000 Nakashima ................. 235/492
6,279,114 B1 * 8/2001 Toombs et al. .............. 713/300

(Continued)

FOREIGN PATENT DOCUMENTS

JP    62-217314 A    9/1987

(Continued)

*Primary Examiner*—Rehana Perveen
*Assistant Examiner*—Stefan Stoynov
(74) *Attorney, Agent, or Firm*—Panitch Schwarze Belisario & Nadel LLP

(57) ABSTRACT

In regard to a peripheral device in which commands are inputted and power is supplied from the main device, a peripheral device which can reduce power consumption while making use of a necessary function is provided. Peripheral device of the present invention comprises a functional unit which carries out a function based on commands from main device; a power control section which controls power consumption of the above-mentioned functional unit; a power profile information memory which memorizes a power profile information list that includes single or plural power profile information; and an interface section which sends and receives the above-mentioned power profile information and commands relevant to the functional unit to and from the above-mentioned main device; wherein the above-mentioned interface section corresponds to the demand from the above-mentioned main device and sends the above-mentioned power profile information list to the above-mentioned main device; and the above-mentioned power control section controls power consumption of the above-mentioned functional unit by corresponding to the selected information of the above-mentioned power profile information that was received from the above-mentioned main device.

13 Claims, 9 Drawing Sheets

U.S. PATENT DOCUMENTS

| | | | |
|---|---|---|---|
| 6,697,883 B1 * | 2/2004 | Jinnouchi | 710/14 |
| 6,963,986 B1 * | 11/2005 | Briggs et al. | 713/320 |
| 6,971,035 B2 * | 11/2005 | Kubota | 713/320 |
| 6,996,731 B1 * | 2/2006 | Obitsu | 713/324 |

FOREIGN PATENT DOCUMENTS

| | | |
|---|---|---|
| JP | 9-34598 A | 2/1997 |
| JP | 11-316625 A | 11/1999 |
| JP | 2001-209764 A | 8/2001 |
| JP | 2003-330578 A | 11/2003 |

* cited by examiner

FIG. 2

| REGISTER NUMBER | POWER CONSUMPTION LEVEL | TRANSMISSION RATE OF A WIRELESS COMMUNICATION | MAXIMUM OUTPUT VALUE OF A POWER AMPLIFIER FOR A SPEAKER | MAXIMUM OUTPUT VALUE OF A POWER AMPLIFIER FOR A WIRELESS COMMUNICATION | ON/OFF INFORMATION OF EACH FUNCTIONAL UNIT |
|---|---|---|---|---|---|
| 0 | 0010 (100mW) | 01 (100kbps) | 000 (SPEAKER OFF) | 010 (10mW) | 100... (FUNCTIONAL UNIT USABLE) |
| 1 | 0100 (200mW) | 01 (100kbps) | 000 (SPEAKER OFF) | 100 (20mW) | 100... (FUNCTIONAL UNIT USABLE) |

201  202  203  204  205  206

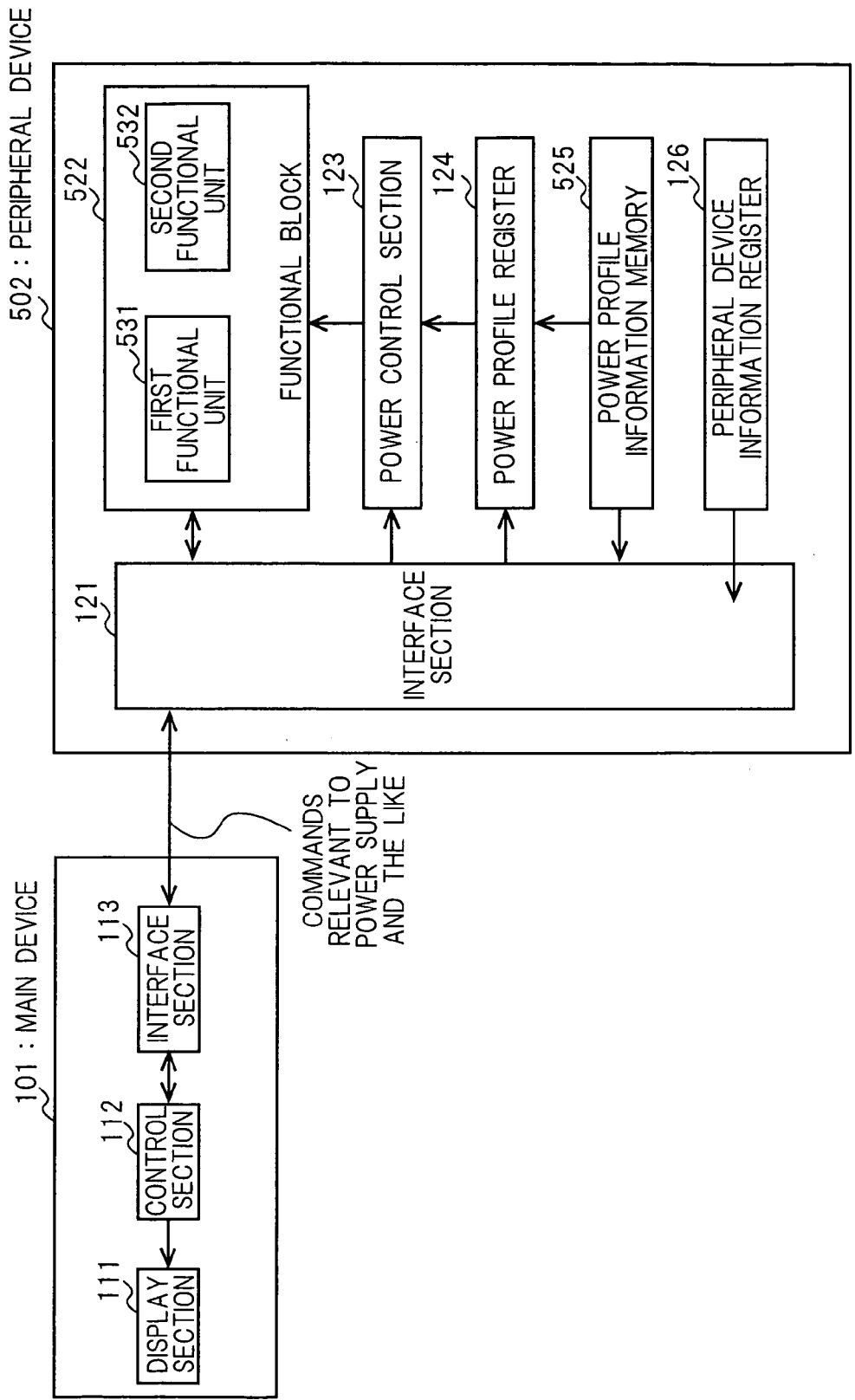

| REGISTER NUMBER 201 | POWER CONSUMPTION LEVEL 202 | TRANSMISSION RATE OF A WIRELESS COMMUNICATION 203 | MAXIMUM OUTPUT VALUE OF A POWER AMPLIFIER FOR A SPEAKER 204 | MAXIMUM OUTPUT VALUE OF A POWER AMPLIFIER FOR A WIRELESS COMMUNICATION 205 | ON/OFF INFORMATION OF EACH FUNCTIONAL UNIT 206 |
|---|---|---|---|---|---|
| 0 | 0 0 1 0 (1 0 0 mW) | 0 1 (1 0 0 kbps) | 0 0 0 (SPEAKER OFF) | 0 1 0 (1 0 mW) | 1 0 0... (FIRST FUNCTIONAL UNIT USABLE) (SECOND FUNCTIONAL UNIT UNUSABLE) |
| 1 | 0 1 0 0 (2 0 0 mW) | 1 0 (2 0 0 kbps) | 0 0 0 (SPEAKER OFF) | 1 0 0 (2 0 mW) | 1 1 0... (FIRST FUNCTIONAL UNIT USABLE) (SECOND FUNCTIONAL UNIT USABLE) |
| 2 | 0 1 1 0 (3 0 0 mW) | 1 1 (4 0 0 kbps) | 0 0 0 (SPEAKER OFF) | 1 1 0 (4 0 mW) | 0 1 0... (FIRST FUNCTIONAL UNIT UNUSABLE) (SECOND FUNCTIONAL UNIT USABLE) |
| 3 | 1 0 0 0 (4 0 0 mW) | 1 1 (4 0 0 kbps) | 0 0 0 (SPEAKER OFF) | 1 1 0 (4 0 mW) | 1 1 0... (FIRST FUNCTIONAL UNIT USABLE) (SECOND FUNCTIONAL UNIT USABLE) |

FIG. 6

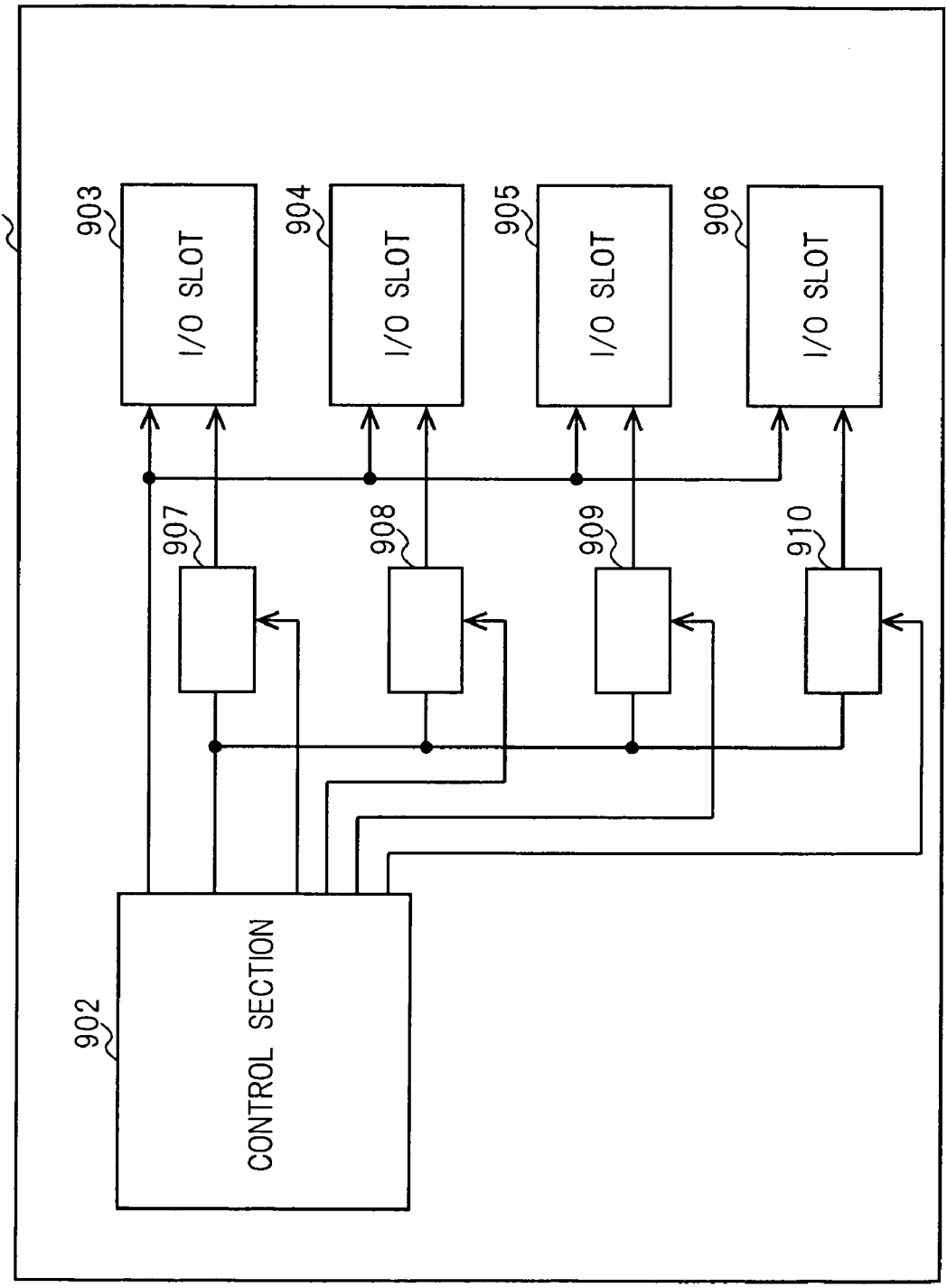

US 7,401,236 B2

PERIPHERAL DEVICE AND ITS CONTROL METHOD ITS MAIN BODY DEVICE AND ITS CONTROL METHOD AND ITS PROGRAM

CROSS-REFERENCE TO RELATED APPLICATION

This application is a Section 371 of International Application No. PCT/JP2004/001225, filed Feb. 5, 2004, the disclosure of which is incorporated herein by reference.

TECHNICAL FIELD

The present invention relates to peripheral device and control method thereof in which commands are inputted from main device and its power is supplied from main device, main device and control method thereof, and program thereof.

BACKGROUND ART

In recent years, along with the popularization of portable information devices such as digital still camera and PDA, compact peripheral devices that can be used not only with personal computers but also in common with portable information devices such as digital still camera and PDA are drawing attention.

Main device and peripheral device of the conventional art 1 are disclosed in the Official Gazette of Japanese Unexamined Patent Publication Sho 62-217314. Main device and peripheral device of the conventional art 1 will be described with reference to FIG. 9.

FIG. 9 is a block diagram showing the configuration of main device having an I/O slot for connecting peripheral device in accordance with the conventional art 1. In FIG. 9, reference numeral 901 denotes a main device. Main device 901 has a control section 902, a plurality of I/O slots 903-906, and reed relays 907-910 which are located at the connecting section of the power supply wiring of I/O slots 903-906 respectively. Peripheral devices of the conventional art 1 which are inserted in I/O slots 903-906, are supplied power from main device 901. Main device 901 opens and closes reed relays 907-910 respectively by program control. By opening and closing reed relays 907-910 respectively, I/O slots 903-906 can individually switch ON/OFF each power supply which is to be supplied to the inserted peripheral devices. Main device 901 can reduce its power consumption by switching off the power supply of peripheral device which is inserted in an I/O slot but needs not to operate.

Peripheral device of the conventional art 2 is disclosed in the Official Gazette of Japanese Unexamined Patent Publication 2001-209764. Peripheral device of the conventional art 2 is an IC card. Peripheral device of the conventional art 2 automatically selects a high internal clock in a case where main device is a stationary type apparatus, and automatically selects a low internal clock in a case where main device is a battery-operated type apparatus.

However, the higher the function of peripheral device becomes, the massive the scale of its circuit becomes, and hence power consumption of a single peripheral device increases. In such cases, there was a problem in which power control would be insufficient when main device of the conventional art 1 which has only the function to switch ON or OFF the power supply in unit of individual peripheral device.

Furthermore, multifunctional peripheral devices have come on the market recently, and there would be a problem in which the entire circuit of peripheral device would operate even in a case where there is a function that is not in use, and hence consumes unnecessary power, when main device of the conventional art 1 is used.

When main device which is a power supply source, is a device that operates on a limited power such as a portable information device and the like, the above-mentioned power consumption issue was much serious.

Peripheral device of the conventional art 2 can change the internal clock corresponding to the main device. An IC card of the conventional art 2 can effectively reduce power consumption when the card is connected to a specific main device. However, for example in regard to IC cards (peripheral device) that were standardized throughout the industry which includes a number of manufacturers, IC cards having various functions are manufactured, and each IC card may be connected to a wide variety of main devices. Depending on an IC card, there is a case where a factor suitable for reducing power of an IC card is a factor other than an internal clock. Depending on an IC card, there is a case where an internal clock cannot be changed. Even when main device is a battery-operated type, there is a case where IC card requires to work at a high-speed internal clock. Main device and peripheral device of the conventional art 2 had difficulty in appropriately controlling power in peripheral devices and main devices that are the connecting counterparts of main devices and peripheral devices, which were not envisioned when that main device and peripheral device were commercialized.

The present invention, in regard to connection with an arbitrary main device, aims to provide a peripheral device, control method thereof, and program thereof, in which the peripheral device does not consume unnecessary power by corresponding to suppliable electric power of the main device.

The present invention, in regard to connection with an arbitrary main device, aims to provide a peripheral device, control method thereof, and program thereof, in which the peripheral device automatically sets to the most appropriate environment by corresponding to functions and the like of the main device, for example giving priority to performance or giving priority to power consumption.

The present invention, in regard to connection with an arbitrary peripheral device, aims to provide a main device and control method thereof, in which the main device automatically sets the peripheral device to the most appropriate environment by corresponding to functions and the like of the peripheral device, for example giving priority to performance or giving priority to power consumption.

The present invention, in regard to connection with an arbitrary peripheral device, aims to provide main device and control method thereof, in which the main device lowers unnecessary power consumption of peripheral device by corresponding to suppliable electric power of main device.

DISCLOSURE OF INVENTION

In order to solve the above-mentioned problems, the present invention has the following configuration. Peripheral device in accordance with the present invention from one aspect comprises: a functional unit which carries out a function based on commands from main device; a power control section which controls power consumption of the above-mentioned functional unit; a power profile information memory which memorizes a power profile information list that includes single or plural power profile information; and an interface section which sends and receives the above-mentioned power profile information and commands relevant to the functional unit to and from the above-mentioned main device; wherein the above-mentioned interface section corresponds to the demand from the above-mentioned main device and sends the above-mentioned power profile information list to the above-mentioned main device; and the above-mentioned power control section controls power consumption of the above-mentioned functional unit by corresponding to the selected information of the above-mentioned power profile information that was received from the above-mentioned main device.

"Power profile information" means information relevant to operating conditions that affects power consumption. Typically, power is supplied to peripheral device from main device.

Peripheral device in accordance with the present invention from another aspect comprises: a functional unit which carries out a function based on commands from main device; a power profile register which memorizes power profile information; a power control section which controls power consumption of the above-mentioned functional unit; a power profile information memory which memorizes a power profile information list that includes single or plural power profile information; and an interface section which sends and receives the above-mentioned power profile information and commands relevant to the functional unit to and from the above-mentioned main device; wherein the above-mentioned interface section corresponds to the demand from the above-mentioned main device and sends the above-mentioned power profile information list memorized in the above-mentioned power profile information memory to the above-mentioned main device, and corresponding to the selected information of the above-mentioned power profile information that was received from the above-mentioned main device, stores the corresponding power profile information from the above-mentioned power profile information memory, in the above-mentioned power profile register; and the above-mentioned power control section deciphers the above-mentioned power profile information stored in the above-mentioned power profile register and controls power consumption of the above-mentioned functional unit based on the deciphered above-mentioned power profile information.

Peripheral device in accordance with the present invention from another aspect comprises: a functional unit which carries out a function based on commands from main device; a power profile information memory which memorizes a power profile information list that includes single or plural power profile information; an interface section which sends and receives information regarding the range of power profiles that the above-mentioned main device designated or power profiles that the above-mentioned main device allowed or commands relevant to the functional unit to and from the above-mentioned main device; a power profile judgment section which extracts the above-mentioned power profile information that is the same or approximates to power profile which is designated or allowed by the above-mentioned main device from the above-mentioned power profile information list stored in the above-mentioned power profile information memory; a power profile register which memorizes the above-mentioned power profile information which is extracted by the above-mentioned power profile judgment section; and a power control section which controls power consumption of the above-mentioned functional unit; wherein the above-mentioned interface section sends information regarding the range of power profile that the above-mentioned main device designated or allowed, which is sent from the above-mentioned main device, to the above-mentioned power profile judgment section; and the above-mentioned power control section deciphers the above-mentioned power profile information stored in the above-mentioned power profile register and controls power consumption of the above-mentioned functional unit based on the deciphered above-mentioned power profile information.

Main device may designate or allow a single power profile or may designate or allow a plurality of or an arbitrary range of power profiles. In a case where main device designates or allows a plurality of or an arbitrary range of power profiles, "the same" typically means it corresponds to 1 of a plurality of power profiles or it is a power profile included in the designated range, and "approximate" means it is not the same but approximates to 1 of a plurality of power profiles or it is close to the designated range. In regard to "approximate", it needs only to extract the most relatively approximate power profile information within the power profile information list. Or, it may extract the most approximate power profile information which realizes lower power consumption than that of designated or suchlike power profile within the power profile information list.

In the above-mentioned peripheral device in accordance with the present invention from another aspect, the above-mentioned power profile judgment section changes the above-mentioned power profile information to be stored in power profile register based on a value of voltage sent from the above-mentioned main device.

For example, the more the value of power supply voltage fed from main device becomes low, the more the power profile information to be stored in power profile register will be changed to that of lower power consumption.

In the above-mentioned peripheral device in accordance with the present invention from another aspect, the above-mentioned power profile information has at least one of the following maximum output value of a power amplifier, transmission rate of a wireless communication, or in use or not of the above-mentioned functional unit, as its element; and the above-mentioned power control section controls power consumption of the above-mentioned functional unit in regard to the above-mentioned element of the above-mentioned power profile register.

Main device in accordance with the present invention from another aspect demands a power profile information list to the above-mentioned peripheral device, wherein the power profile information list includes single or plural power profile information which is information for the peripheral device to control power; selects single power profile information which is appropriate for the main device from the above-mentioned power profile information list sent from the above-mentioned peripheral device; and sends the selected information of the selected power profile information to the above-mentioned peripheral device.

In the above-mentioned main device in accordance with the present invention from another aspect, various above-mentioned power profile information is determined corresponding to the value of power supply voltage.

In the above-mentioned main device in accordance with the present invention from another aspect, the above-mentioned power profile information has at least one of the following maximum output value of a power amplifier, value of clock frequency of a functional unit, or in use or not of the above-mentioned functional unit, as its element.

Control method of peripheral device in accordance with the present invention from another aspect comprises: a sending step of corresponding to a demand from main device and sending a power profile information list which includes single or plural power profile information to the above-mentioned main device; a receiving step of receiving the selected information of power profile information which is sent from the above-mentioned main device; and a power controlling step of controlling power consumption of functional unit corresponding to the selected information of the above-mentioned power profile information.

Control method of peripheral device in accordance with the present invention from another aspect comprises: a sending step of corresponding to a demand from main device and sending a power profile information list which includes single or plural power profile information to the above-mentioned main device; a receiving step of receiving the selected information of power profile information which is sent from the above-mentioned main device; a memorizing step of extracting and memorizing the above-mentioned power profile information which corresponds to the above-mentioned selected information of the above-mentioned power profile information from the power profile memory; and a power controlling step of deciphering the above-mentioned power profile information and controlling power consumption of functional unit based on the deciphered above-mentioned power profile information.

Control method of peripheral device in accordance with the present invention from another aspect comprises: a receiving step of receiving information regarding the range of power profiles which the above-mentioned main device designated or power profiles which the above-mentioned main device allowed which is sent from the main device; a power profile judging step of extracting the above-mentioned power profile information which is the same or approximates to the power profile designated or allowed by the above-mentioned main device from power profile information list which includes single or plural power profile information that is stored in power profile information memory; and a power control step of controlling power consumption of a functional unit based on the extracted above-mentioned power profile information.

Control method of main device in accordance with the present invention from another aspect demands a power profile information list to the above-mentioned peripheral device, wherein the power profile information list includes single or plural power profile information which is information for the peripheral device to control power; selects single power profile information which is appropriate for the main device from the above-mentioned power profile information list sent from the above-mentioned peripheral device; and sends the selected information of a selected power profile information to the above-mentioned peripheral device.

Program in accordance with the present invention from another aspect is a program to make the computer execute the above-mentioned control methods of peripheral device.

"Functional unit" means a unit which exerts a single unitary commodity function. For example, a wireless communication module, memory module, and the like. It is a unit larger than a functional element (for example, a latch circuit) which users do not recognize.

The present invention, in regard to connection with an arbitrary main device, has an action capable of realizing a peripheral device, control method thereof, and program thereof, wherein the peripheral device exerts functions which accords with functions etc. of the main device, and also does not consume unnecessary power.

The present invention, in regard to connection with an arbitrary peripheral device, has an action capable of realizing a main device which controls peripheral devices, and control method thereof, so that peripheral device makes use of functions which accords with functions and the like of main device, and also does not consume unnecessary power.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 2 shows a power profile information list stored in power profile information memory of peripheral device in accordance with the first embodiment of the present invention.

FIG. 5 is a block diagram showing the configuration of main device and peripheral device in accordance with the second embodiment of the present invention.

FIG. 6 shows a power profile information list stored in power profile information memory of peripheral device in accordance with the second embodiment and third embodiment of the present invention.

FIG. 9 is a block diagram showing the configuration of main device having an I/O slot for connecting a peripheral device in accordance with the conventional art 1.

Part or all of the drawings are drawn schematically for diagrammatic representation and it should be considered that they do not necessarily reflect relative size and position of components shown therein.

BEST MODE FOR CARRYING OUT THE INVENTION

Embodiments that specifically show the best mode for conducting the present invention will be described below with reference to figures.

FIRST EMBODIMENT

Peripheral device and control method thereof, and main device and control method thereof, and program thereof in accordance with the first embodiment of the present invention will be described with reference to FIG. 1 through FIG. 4.

Figure 1:
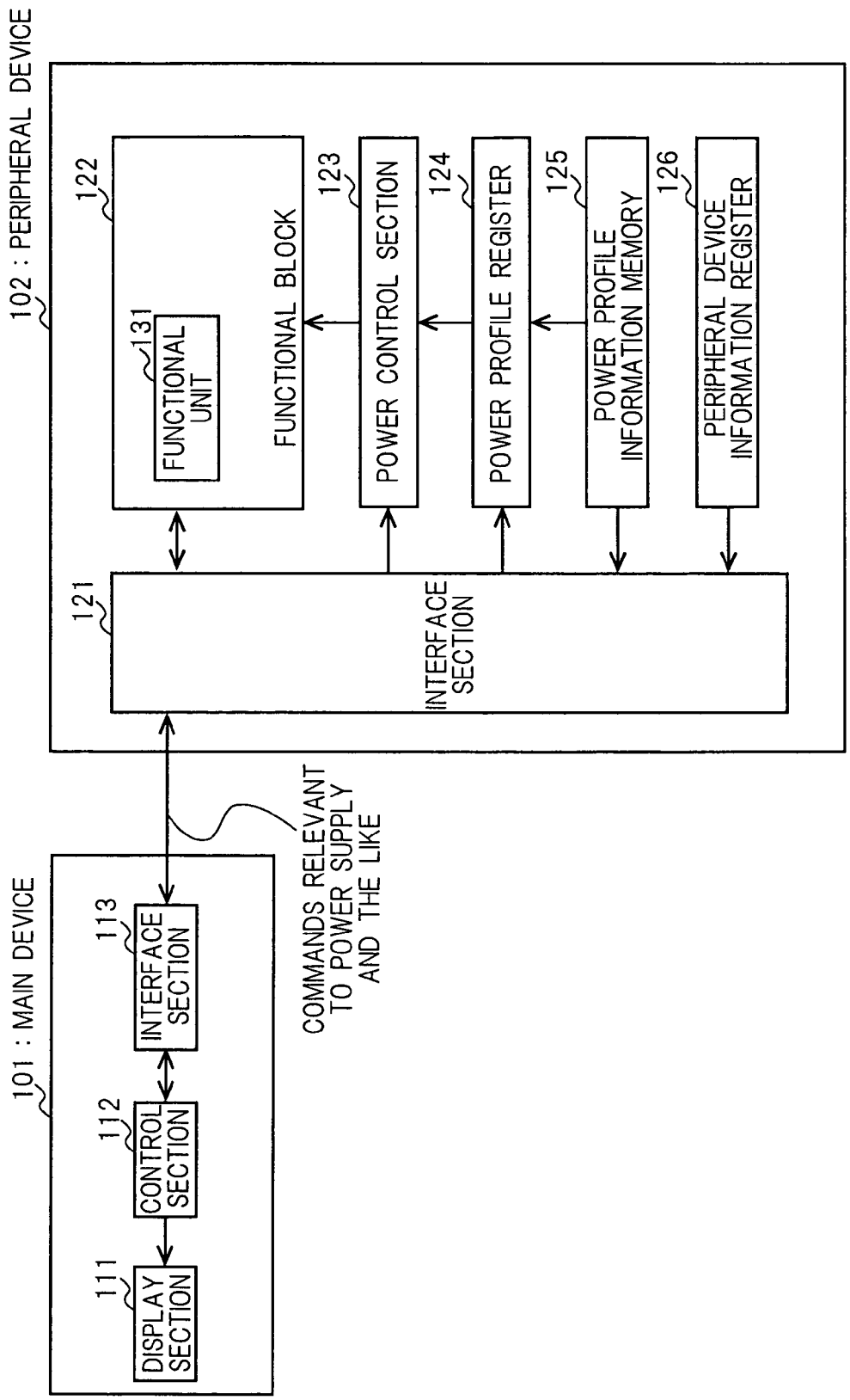
FIG. 1 is a block diagram showing the configuration of main device and peripheral device in accordance with the first embodiment of the present invention.

Firstly, the configuration of main device and peripheral device in accordance with the first embodiment will be described. FIG. 1 is a block diagram showing the configuration of main device and peripheral device in accordance with the first embodiment of the present invention. In FIG. 1, a reference numeral 101 denotes a main device, a reference numeral 102 denotes a peripheral device. Main device 101 has a display section 111, a control section 112, and an interface section 113. Peripheral device 102 has an interface section 121, a functional block 122, a power control section 123, a power profile register 124, a power profile information memory 125, and a peripheral device information register 126. Functional block 122 has a functional unit 131.

In the first embodiment, main device 101 is a computer, and peripheral device 102 is an IC card. Functional unit 131 is a wireless communication module. Main device 101 and peripheral device 102 communicates in a master-slave mode in which main device 101 is the master and peripheral device 102 is the slave. Main device 101 supplies power to peripheral device 102. Operating conditions of peripheral device 102 is changed, corresponding to the power supply capacity of main device 101.

Interface section 121 sends and receives information to and from main device 101. When the information sent from main device 101 is a register number of power profile information which main device 101 determined, interface section 121 transmits the information to power profile register 124, and when the information is a command for a functional unit, interface section 121 transmits the information to functional unit 131.

Power control section 123 reads out the power profile information memorized in power profile register 124, and controls power consumption of functional unit 131 based on the power profile information which was read.

Power profile information memory 125 stores a power profile information list which includes single or plural power profile information. Hereupon, power profile information is information for controlling power which is in a standardized format used in common with a plurality of main devices and peripheral devices. Power profile information can be sent and received to and from arbitrary main device and arbitrary peripheral device.

Peripheral device information register 126 stores information regarding what functional unit does the peripheral device has.

In the following, power profile information will be described further in detail. FIG. 2 shows a power profile information list stored in a power profile information memory 125. In FIG. 2, a reference numeral 201 denotes a register number, a reference numeral 202 denotes a power consumption level (4 bits), reference numerals 203 to 205 are information relevant to functions of a functional unit, in which a reference numeral 203 denotes a transmission rate of a wireless communication (2 bits), a reference numeral 204 denotes maximum output value of a power amplifier for a speaker (3 bits), a reference numeral 205 denotes maximum output value of a power amplifier for a wireless communication (3 bits), and a reference numeral 206 denotes ON/OFF information of each functional unit (16 bits). Hereupon, the upper row is data stored in power profile information memory 125 (represented in binary notation), and the lower row (enclosed in parenthesis) is affixed to describe the content which the upper row denotes.

Figure 3:
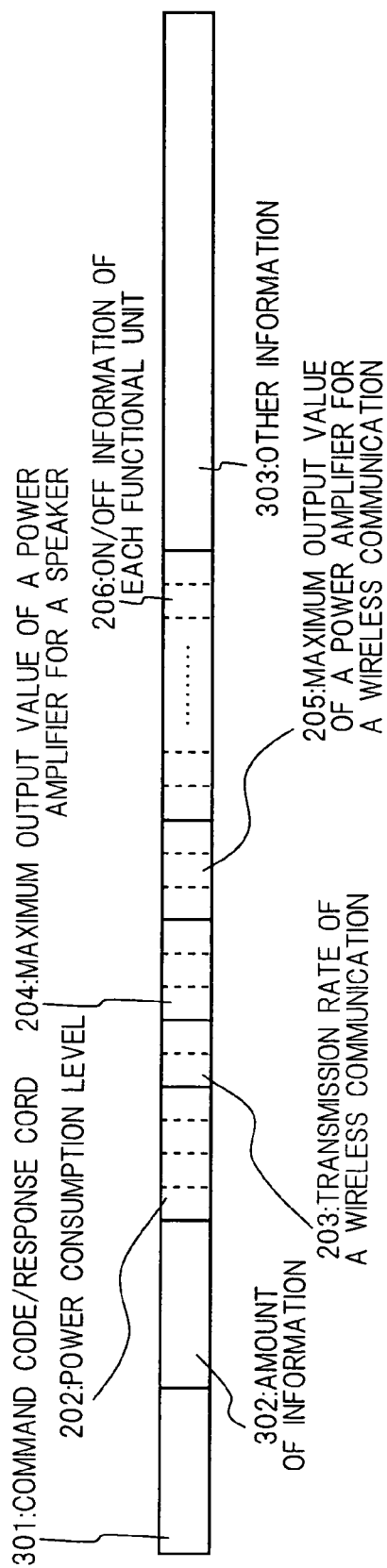
FIG. 3 shows the configuration of transmission data which includes power profile information that is transmitted between main device and peripheral device in accordance with the first embodiment through the third embodiment of the present invention.

FIG. 3 shows the configuration of transmission data which includes power profile information that is transmitted between the main device 101 and the peripheral device 102 in accordance with the first embodiment through the third embodiment of the present invention. In FIG. 3, a reference numeral 301 denotes a command code or a response cord showing that data to be transmitted is power profile information, a reference numeral 302 denotes the amount of information of data to be transmitted, reference numerals 202 through 206 denote power profile information shown in FIG. 2, in which a reference numeral 202 denotes a power consumption level (4 bits), a reference numeral 203 denotes a transmission rate of a wireless communication (2 bits), a reference numeral 204 denotes maximum output value of a power amplifier for a speaker (3 bits), a reference numeral 205 denotes maximum output value of a power amplifier for a wireless communication (3 bits), and a reference numeral 206 denotes ON/OFF information of each functional unit (16 bits). A reference numeral 303 denotes other information.

Power consumption level 202 shows the power consumption when functional unit 131 is operated in a predetermined condition. Power consumption level 202 shows a relative power consumption level. In a case where power consumption level 202 is "0000" (binary notation), peripheral device 102 stops the entire functions, and does not consume power. In a case where power consumption level 202 is "1111" (binary notation), either a peripheral device 102 works in maximum electric power consumption, or a power control section 123 does not control power based on power consumption level 202 but controls power based on other factors (for example, transmission rate of a wireless communication 203).

Peripheral device 102 may change the power consumption level 202 in 16 phases, or may change for example in 4 phases based on power consumption level 202. In the case where power consumption level 202 is for example "1000" (binary notation), peripheral device 102 sets its power consumption level to an intermediate-level (for example, 2 in four levels of 0 to 3). Power consumption level 202 may show an absolute power consumption level. Transmission data, for example, may consist only of command code or response cord 301, amount of information 302 and power consumption level 202.

Information relevant to functions of each functional unit (203 to 205) shows conditions to operate functional unit 131.

Transmission rate of wireless communication 203 shows a relative value of transmission rate of wireless communication. When transmission rate of wireless communication 203 is "00" (binary notation), peripheral device 102 sets the transmission rate of wireless communication to the lowest value, and minimizes power consumption. When transmission rate of wireless communication 203 is "11" (binary notation), peripheral device 102 sets the transmission rate of wireless communication to the highest value, maximizes power consumption, and enables to respond the fastest.

Maximum output value of a power amplifier for speakers 204 shows a relative value of maximum output value of power amplifier for speakers. When maximum output value of power amplifier for speakers 204 is "000" (binary notation), peripheral device 102 does not operate the speaker and will not supply power to the speaker. When maximum output value of power amplifier for speakers 204 is "111" (binary notation), peripheral device 102 sets the maximum output value of power amplifier for speakers 204 to the maximum, maximizes power consumption, and makes the speaker output the largest sound. Parenthetically, peripheral device 102 which does not have a speaker ignores maximum output value of power amplifier for speakers 204.

Maximum output value of power amplifier for wireless communication 205 shows a relative value of maximum output value of power amplifier for wireless communication. When maximum output value of power amplifier for wireless communication 205 is "000" (binary notation), peripheral device 102 does not operate the power amplifier of functional unit (wireless communication module) 131, and does not supply power to power amplifier. When maximum output value of power amplifier for wireless communication 205 is "111" (binary notation), peripheral device 102 sets the maximum output value of power amplifier for wireless communication 205 to the maximum, maximize power consumption, and enables the functional unit (wireless communication module) 131 to communicate to the longest distance.

ON/OFF information of each functional unit 206 show whether functional unit 131 is usable or not. Each bit of ON/OFF information of functional unit 206 (16 bits) is made to correspond to a single specific functional unit, respectively. When one bit is 1, the functional unit which is made to correspond to that bit is active, and when that bit is 0, the functional unit which is made to correspond to that bit does not operate, and power control section 123 minimizes the power consumption of that functional unit.

Other information 303 is an optional data, for example, information relevant to an element or a functional unit which is not included in standardized power profile information.

Peripheral device 102 works to ignore information of element which the peripheral device does not possess; and for example in the first embodiment, maximum output value 204 of power amplifier for speakers is ignored in a peripheral device which does not possess a speaker, and since there is only one functional unit, only the first one bit of ON/OFF information 206 is to be used.

Figure 4:
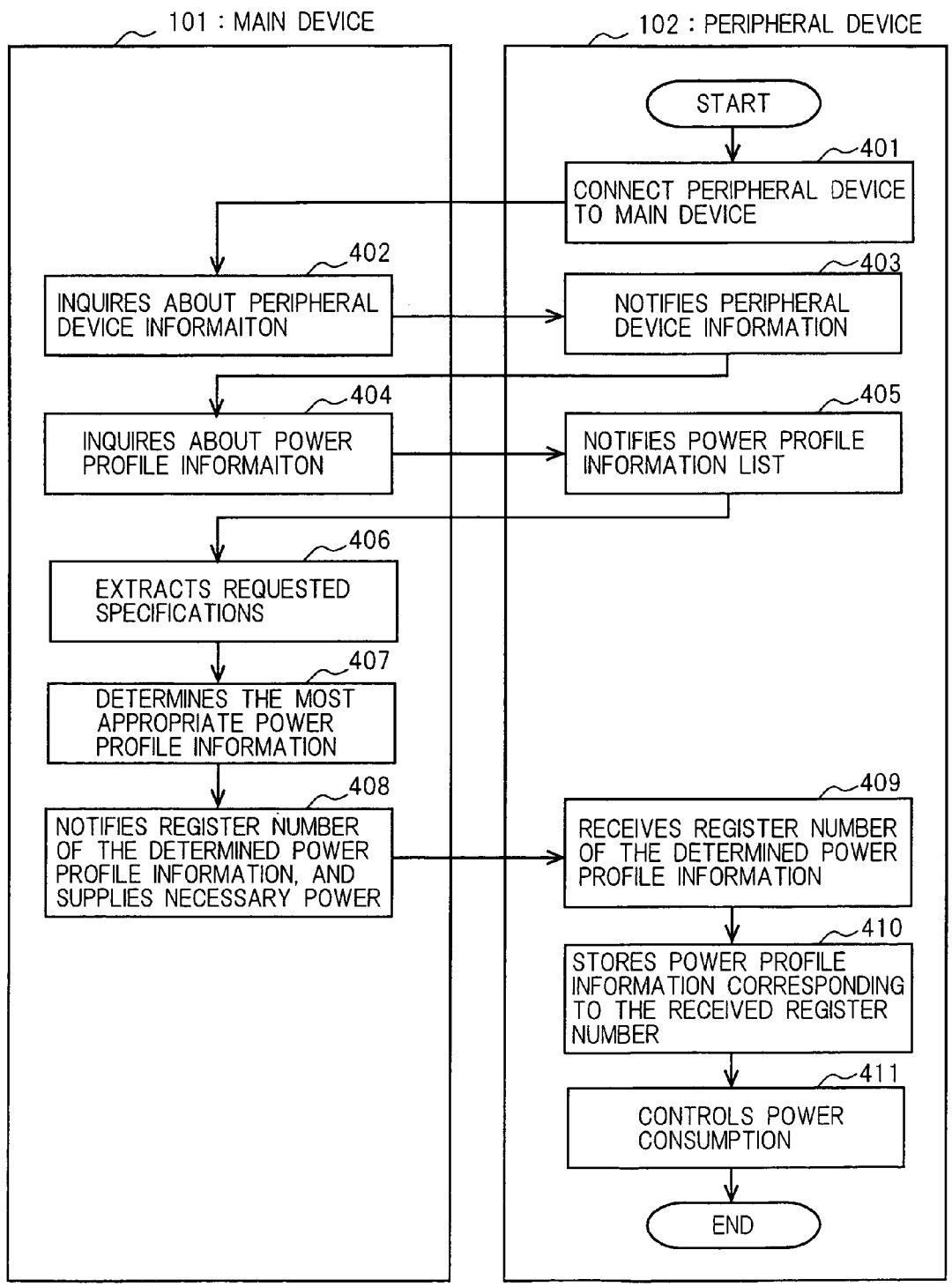
FIG. 4 is a flowchart of a power controlling method of main device and peripheral device in accordance with the first embodiment and second embodiment of the present invention.

Subsequently, control method of main device and peripheral device in accordance with the first embodiment will be described. FIG. 4 is a flowchart of a power controlling method of main device and peripheral device in accordance with the first embodiment of the present invention. In step 401, peripheral device 102 is connected to main device 101, and information that peripheral device is connected to main device is transmitted to main device 101. In step 402, main device 101 inquires to peripheral device 102 about the peripheral device information. Peripheral device information is information which shows what peripheral device 102 is, for example, information that peripheral device 102 is an IC card having a wireless communication module. In step 403, peripheral device 102 notifies main device 101 of peripheral device information that is read out from peripheral device information register 126. Hereby, main device 101 recognizes that the connected peripheral device 102 is an IC card having a wireless communication module.

In step 404, main device 101 inquires to peripheral device 102 about the power profile information. In step 405, peripheral device 102 reads out the power profile information list (FIG. 2) from the power profile information memory 125, generates a transmission data shown in FIG. 3 based on the power profile information list which is read out, and notifies main device 101 of the transmission data. Hereupon, with regard to the transmission data to be sent to main device 101, parts corresponding to 202-206 of FIG. 3 (power profile information) are two transmission data of "0010010000101000000000000000" (register number zero) and "0100010001001000000000000000" (register number 1). Hereby, main device 101 can obtain power profile information of the connected peripheral device 102. When there is plural power profile information as in this embodiment, transmission data are sent in ascending order of register number, thereby capable of knowing the register numbers of power profile information from the order in which power profile information is received.

In step 406, main device 101 determines requested specifications based on peripheral device information which is received, or picks out and determines the requested specifications which was built-in beforehand. Requested specifications are (1) the power which main device 101 can supply to peripheral device 102, and (2) the function which is to be demanded to peripheral device 102.

For example, in a case where main device 101 has, in advance, requested specifications in regard to multiple types of peripheral devices, wherein peripheral device information is an IC card having a wireless communication module, the requested specifications for an IC card having a wireless communication module is picked out.

Hereupon, the determined requested specifications are assumed that: (1) maximum power suppliable to peripheral device is 150 mW, and (2) wireless communication output power of functional unit is not less than 5 mW. Parenthetically, requested specifications may designate the entire condition, or may designate only one condition.

In step 407, main device 101 determines the most appropriate power profile information, based on requested specifications. In this embodiment, since the requested specifications are, that maximum power suppliable to peripheral device 102 is 150 mW, and that wireless communication output power of functional unit is not less than 5 mW, power profile information of register number "zero" is selected. In step 408, main device 101 notifies peripheral device 102 of register number of the determined power profile information, and supplies necessary power to peripheral device 102.

In step 409, peripheral device 102 receives register number of the determined power profile information. In step 410, peripheral device 102 stores power profile information corresponding to the received register number in power profile register 124. In step 411, power control section 123 controls power consumption of functional unit 131 based on power profile information stored in power profile register 124. Since peripheral device 102 receives register number "zero" in the case of the present embodiment, power profile register 124 memorizes power profile information "0010010000101000000000000000", and complying with this power profile information, power control section 123 operates functional unit (wireless communication module) 131 with transmission rate of 100 kbps, and wireless communication output power of 10 mW.

In main device and control method thereof in accordance with the first embodiment, main device automatically determines the most appropriate power profile information, based on requested specifications. Instead of this, the present invention may let a user set arbitrary requested specifications within range of suppliable power. User will, for example, set an operation that consumes high power consumption in a short time as the requested specifications, or set the requested specifications so as to use the device for a long time with low power consumption.

Parenthetically, functional unit of peripheral device in accordance with the first embodiment is a wireless communication module, but instead, it may be a camera module that will be used by connecting to a USB or it may be other functional modules.

In peripheral device and control method thereof, main device and control method thereof, and program thereof in accordance with the first embodiment, main device determines the power profile information when peripheral device is connected to the main device, based on requested specifications. Instead, main device may determine power profile information when power of main device is turned on while peripheral device is connected, based on the requested specifications, or may detect power which main device can supply (for example, by monitoring the voltage of a battery which is the power supply) at regular time intervals, and determine power profile information based on this. It will do as well to redetermine power profile information when power which the main device can supply becomes a certain value or lower. It is useful in such cases as when main device is battery-driven.

Requested specifications of main device in accordance with the first embodiment are tolerance level of power which the main device can supply to peripheral device, and permissible range of function which the main device demands to peripheral device. Instead, it will do as well to designate power which the main device can supply to peripheral device, and function which the main device demands to peripheral device. In this case, main device determines power profile information which is the same as or approximates to the requested specifications.

As described above, in regard to the first embodiment, by making the main device select the most appropriate power profile information based on power profile information of peripheral device and requested specifications of main device, it became possible for the main device to control among arbitrary peripheral devices so as to make the peripheral device to exert the function which main device demands to peripheral device and also not to consume unnecessary power.

SECOND EMBODIMENT

Peripheral device and control method thereof, main device and control method thereof, and program thereof in accordance with the second embodiment will be described with reference to FIG. 5 and FIG. 6.

Firstly, the configuration of main device and peripheral device in accordance with the second embodiment will be described. FIG. 5 is a block diagram showing the configuration of main device and peripheral device in accordance with the second embodiment of the present invention. A difference of the second embodiment from the first embodiment (FIG. 1) is that a single functional unit is added to the peripheral device. In other points, main device and peripheral device in accordance with the second embodiment are the same as main device and peripheral device in accordance with the first embodiment. In FIG. 5 (second embodiment), a similar numeral is affixed to components similar to FIG. 1 (first embodiment), and its description will be omitted.

In FIG. 5, a reference numeral 101 denotes a main device, a reference numeral 502 denotes a peripheral device. Main device 101 has a display section 111, a control section 112, and an interface section 113. Peripheral device 502 has an interface section 121, a power control section 123, a power profile register 124, a peripheral device information register 126, a functional block 522, and a power profile information memory 525. Functional block 522 has a first functional unit 531 and a second functional unit 532.

In the second embodiment, main device 101 is a computer, and peripheral device 502 is an IC card. First functional unit 531 is a memory module (consists of flash memories), and second functional unit 532 is a wireless communication module. Main device 101 and peripheral device 502 communicates in a master-slave mode in which main device is the master and peripheral device is the slave. Main device 101 supplies power to peripheral device 502.

In the following, power profile information will be described. FIG. 6 shows a power profile information list stored in power profile information memory 525 of peripheral device 502 in accordance with the second embodiment of the present invention. In FIG. 6 (second embodiment), a similar numeral is affixed to components similar to FIG. 2 (first embodiment), and its description will be omitted. Power profile information list in FIG. 6 differs from that of the first embodiment, in which power profile information list has four parts of power profile information (parts corresponding to register 0 through register 3), and the part of first bit and second bit of ON/OFF information of functional unit 206 operates effectively, wherein ON/OFF information of functional unit corresponds to having two functional units, the first functional unit and the second functional unit.

Subsequently, control method of main device and peripheral device in accordance with the second embodiment will be described. Parenthetically, since basic flow is similar to that of the first embodiment, FIG. 4 which was used in the first embodiment will be used hereafter in regard to describing the control method of main device and peripheral device in accordance with the second embodiment. Since step 401 through step 404 are similar to that in the first embodiment, its description will be omitted. In step 405, peripheral device 502 reads out the power profile information list (FIG. 6) from the power profile information memory 525, generates a transmission data based on the power profile information list which is read out, and notifies main device 101 of the transmission data. Transmission data to be sent to main device are: transmission data of "0010010000101000000000000000" (register number zero); transmission data of "0100100001001100000000000000" (register number 1); transmission data of "0110110001100100000000000000" (register number 2); and transmission data of "1000110001101100000000000000" (register number 3), in which these numerals denote 202-206 of FIG. 3 (power profile information). Hereby, main device 101 can obtain power profile information of the connected peripheral device 502. As described in the first embodiment, when there is plural power profile information as in this embodiment, transmission data are sent in ascending order of register number, thereby capable of knowing the register numbers of power profile information from the order in which power profile information is received.

In step 406, main device 101 determines requested specifications based on peripheral device information which is received, or picks out and determines the requested specifications which is built-in beforehand. Requested specifications are (1) the power which main device 101 can supply to peripheral device 502, and (2) the function which is to be demanded to peripheral device 502.

For example, in a case where main device 101 has, in advance, requested specifications in regard to multiple types of peripheral devices, wherein peripheral device information is an IC card having a wireless communication module, the requested specifications for an IC card having a wireless communication module is picked out.

Hereupon, the determined requested specifications are assumed that: (1) maximum power suppliable to peripheral device 502 is 250 mW, and (2) in regard to functional unit which is to be demanded to peripheral device 502, transmission rate of the second functional unit 532 is not less than 150 kbps, wireless communication output power of the second functional unit 532 is not less than 15 mW, and that the first functional unit 531 and the second functional unit 532 are both usable.

In step 407, main device 101 determines the most appropriate power profile information based on requested specifications. In this embodiment, since the requested specifications are, that maximum power suppliable to peripheral device 502 is 250 mW, and that transmission rate of the second functional unit 532 is not less than 150 kbps, wireless communication output power of the second functional unit 532 is not less than 15 mW, and that the first functional unit 531 and the second functional unit 532 are both usable, power profile information of register number "1" is selected. In step 408, main device 101 notifies peripheral device 502 of the determined register number of power profile information, and supplies necessary power to peripheral device 502.

In step 409, peripheral device 502 receives register number of the determined power profile information. In step 410, peripheral device 502 stores power profile information corresponding to the received register number in power profile register 124. In step 411, power control section 123 controls power consumption of the first functional unit 531 and the second functional unit 532 based on power profile information stored in power profile register 124. Since peripheral device 502 receives register number "1" in the case of the present embodiment, power profile register 124 memorizes power profile information "0100100001001100000000000000", power control section 123 makes the first functional unit (memory module) 531 operable, and operates the second functional unit (wireless communication module) 532 with transmission rate of 200 kbps, and wireless communication output power of 20 mW.

In main device and control method thereof in accordance with the second embodiment, main device automatically determines the most appropriate power profile information based on requested specifications. Instead, the present invention may let the user select the function which the user desires to use within range of suppliable power. For example, in a case where power which the main device 101 can supply to peripheral device is 300 mW or lower, the present invention displays a selection screen of "(1) Use only memory function (Power consumption 100 mW); (2) Use both memory function and wireless communication function (Maximum output value of power amplifier for wireless communication is 20 mW, power consumption 200 mW); (3) Use only wireless communication function (Maximum output value of power amplifier for wireless communication is 40 mW, power consumption 300 mW)" on the display of main device, and user will select one from (1) through (3).

Parenthetically, functional unit of peripheral device in accordance with the second embodiment are a memory module and a wireless communication module, but instead, it may be a camera module that will be used by connecting to a USB or it may be other functional modules.

In peripheral device and control method thereof, main device and control method thereof, and program thereof in accordance with the second embodiment, main device determines the power profile information when peripheral device is connected to main device, based on requested specifications. Instead, main device may determine power profile information when power of main device is turned on while peripheral device is connected based on requested specifications, or may detect power which the main device can supply (for example, by monitoring the voltage of a battery) at regular time intervals, and determine power profile information based on this. It will do as well to redetermine power profile information when power which the main device can supply becomes a certain value or lower. It is useful in such cases as when main device is battery-driven.

Requested specifications of main device in accordance with the second embodiment are permissible range of power which the main device can supply to peripheral device, and permissible range of function which the main device demands to peripheral device. Instead, it will do as well to designate power which the main device can supply to peripheral device, and function which the main device demands to peripheral device. In this case, main device determines power profile information which is the same as or approximates to the requested specifications.

As described above, in regard to the second embodiment, by making the main device select the most appropriate power profile information based on power profile information of multifunctional peripheral device and requested specifications of main device, it became possible for the main device to control among arbitrary peripheral devices so as to make the peripheral device to exert the function which the main device demands to peripheral device and also not to consume unnecessary power.

THIRD EMBODIMENT

Peripheral device and control method thereof, main device and control method thereof, and program thereof in accordance with the third embodiment will be described with reference to FIG. 7 and FIG. 8.

Firstly, the configuration of main device and peripheral device in accordance with the third embodiment will be described. FIG. 7 is a block diagram showing the configuration of main device and peripheral device in accordance with the third embodiment of the present invention. Differences of the third embodiment from the second embodiment (FIG. 5) is that a power profile judgment section is added to the peripheral device, and that instead of the main device, power profile judgment section determines the power profile information to be set in the power profile register. In other points, main device and peripheral device in accordance with the third embodiment are the same as main device and peripheral device in accordance with the second embodiment. In FIG. 7 (third embodiment), a similar numeral is affixed to components similar to FIG. 5 (second embodiment), and its description will be omitted.

Figure 7:
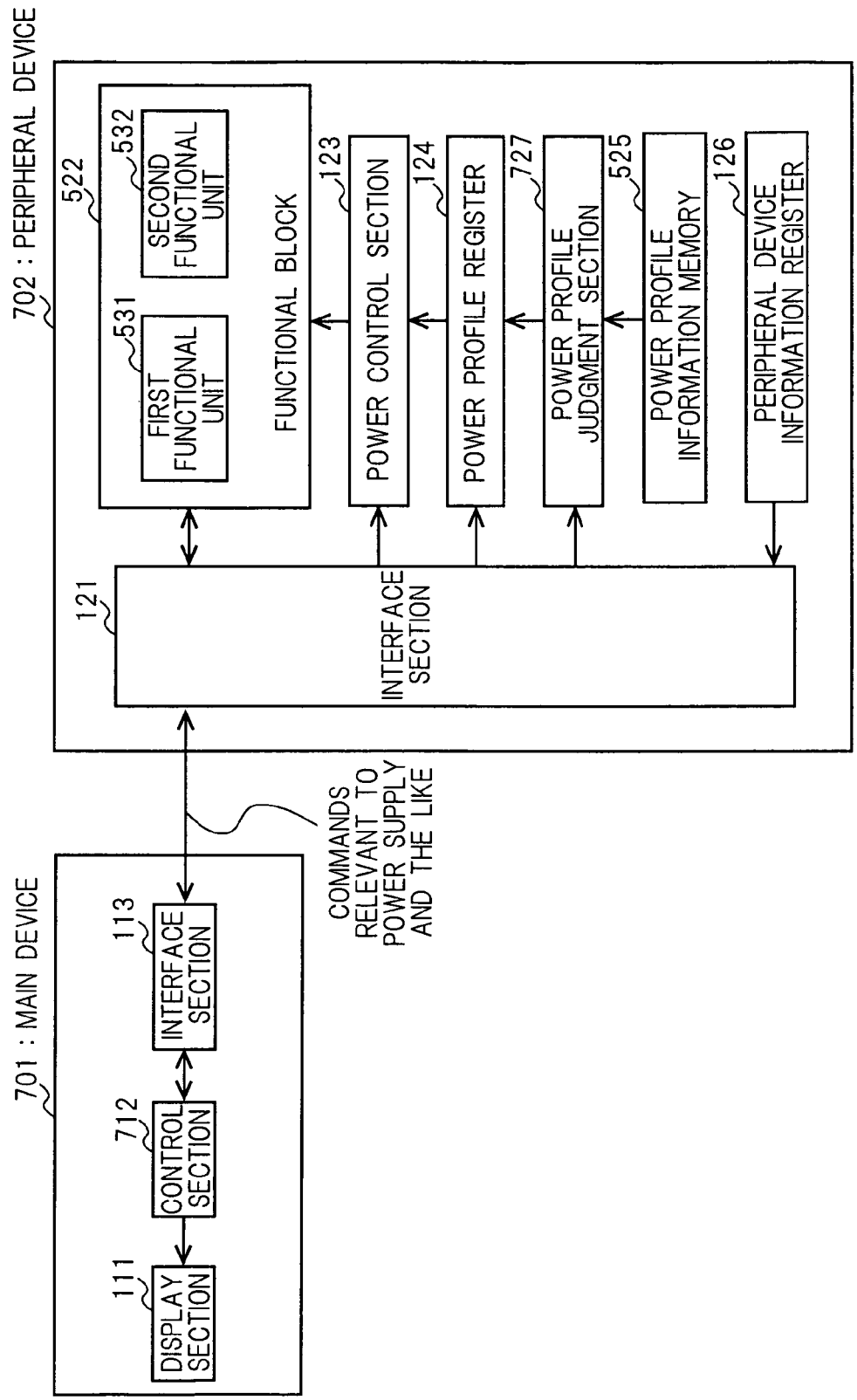
FIG. 7 is a block diagram showing the configuration of main device and peripheral device in accordance with the third embodiment of the present invention.
Figure 8:
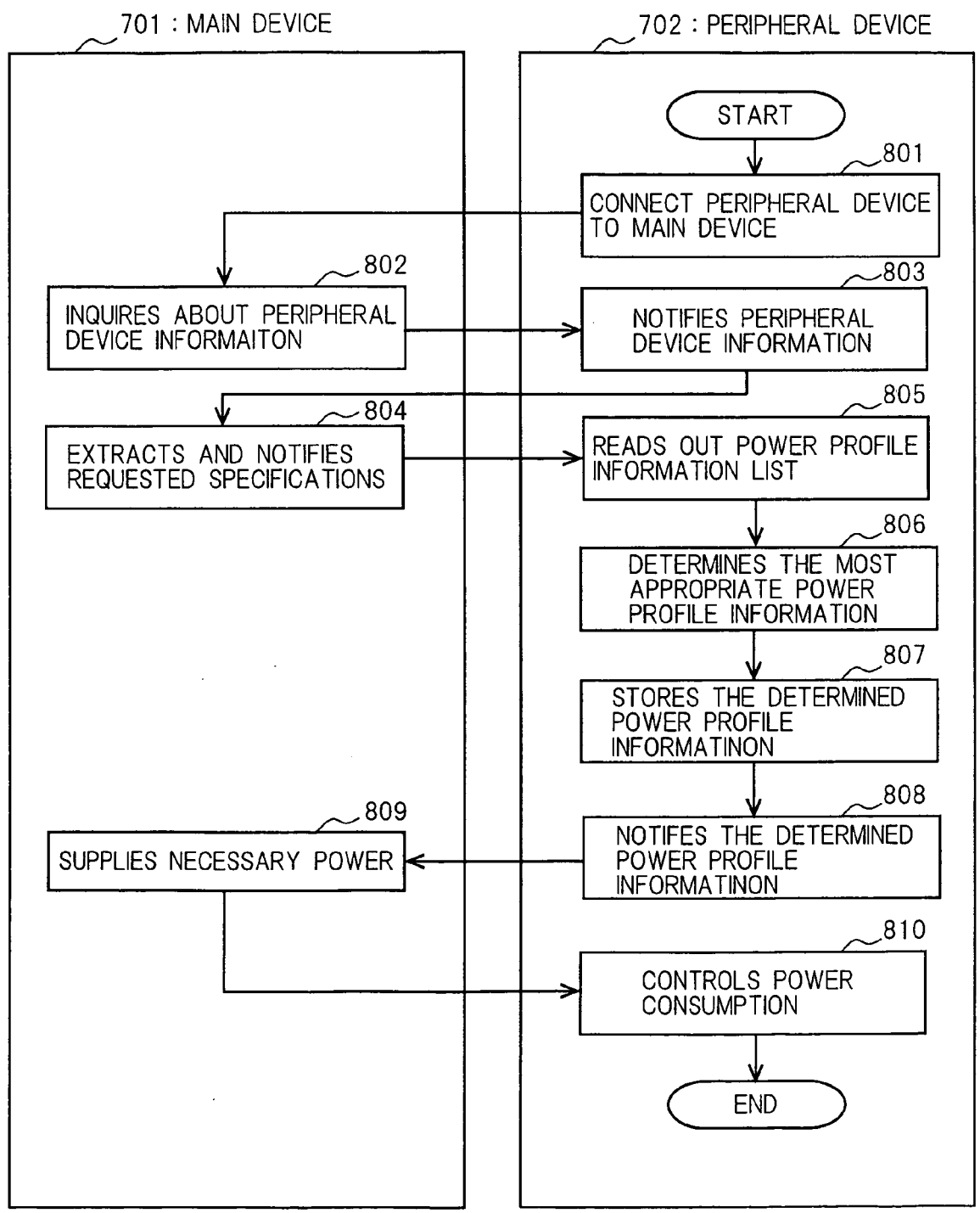
FIG. 8 is a flowchart of a power controlling method of main device and peripheral device in accordance with the third embodiment of the present invention.

In FIG. 7, a reference numeral 701 denotes a main device, a reference numeral 702 denotes a peripheral device. Main device 701 has a display section 111, an interface section 113, and a control section 712. Peripheral device 702 has an interface section 121, a power control section 123, a power profile register 124, a peripheral device information register 126, a functional block 522, a power profile information memory 525, and a power profile judgment section 727. Functional block 522 has a first functional unit 531 and a second functional unit 532.

In the third embodiment, main device 701 is a computer, and peripheral device 702 is an IC card. First functional unit 531 is a memory module (consists of flash memories), and second functional unit 532 is a wireless communication module. Main device 701 and peripheral device 702 communicates in a master-slave mode in which main device 701 is the master and peripheral device 702 is the slave. Main device 701 supplies power to peripheral device 702.

Power profile judgment section 727 determines the most appropriate power profile information from the power profile information list based on requested specifications of main device 701, and transmits the determined power profile information to power profile register 124. Power profile register 124 memorizes the power profile information which power profile judgment section 727 transmitted.

Subsequently, control method of main device and peripheral device in accordance with the third embodiment will be described. FIG. 8 is a flowchart of a power controlling method of main device and peripheral device in accordance with the third embodiment of the present invention. In step 801, peripheral device 702 is connected to main device 701, and information that peripheral device is connected to main device is transmitted to main device 701. In step 802, main device 701 inquires to peripheral device 702 about the peripheral device information. For example, information that peripheral device 702 is an IC card having a memory module and a wireless communication module. In step 803, peripheral device 702 notifies main device 701 of peripheral device information that is read out from peripheral device information register 126. Hereby, main device 701 recognizes that the connected peripheral device 702 is an IC card having a memory module and a wireless communication module.

In step 804, main device 701 determines requested specifications based on peripheral device information which is received, or picks out and determines requested specifications which is built-in beforehand, or picks out requested specification which the user has set, and notifies peripheral device 702 of the requested specifications.

For example, in a case where main device 701 has, in advance, requested specifications in regard to multiple types of peripheral devices, wherein peripheral device information is an IC card having a wireless communication module, the requested specifications for an IC card having a wireless communication module is picked out.

Hereupon, the requested specifications are assumed that: (1) maximum power suppliable to peripheral device 702 is 250 mW; and (2) in regard to the function which is to be demanded to peripheral device 702, transmission rate of the second functional unit 532 is not less than 150 kbps, wireless communication output power of the second functional unit 532 is not less than 15 mW, and that the first functional unit 531 and the second functional unit 532 are both usable. In step 805, peripheral device 702 reads out the power profile information list (FIG. 6) from the power profile information memory 525. In step 806, power profile judgment section 727 of peripheral device 702 determines the most appropriate power profile information, based on requested specifications. In this embodiment, since the requested specifications are, that maximum power suppliable to peripheral device 702 is 250 mW, and that transmission rate of the second functional unit 532 is not less than 150 kbps, wireless communication output power of the second functional unit 532 is not less than 15 mW, and that the first functional unit 531 and the second functional unit 532 are both usable, power profile information of register number "1" is selected.

In step 807, power profile judgment section 727 transmits the determined power profile information to power profile register 124, and power profile register 124 memorizes the transmitted power profile information. In step 808, peripheral device 702 notifies main device 701 of the determined power profile information. Power profile register 124 memorizes power profile information "0100100001001100000000000000", and with regard to transmission data to be sent to main device 701, a part corresponding to 202-206 of FIG. 3 (power profile information) is a transmission data of "0100100001001100000000000000" (register number 1).

In step 809, main device 701 supplies the necessary power to peripheral device 702. In step 810, power control section 123 of peripheral device 702 controls power consumption of the first functional unit 531 and the second functional unit 532 based on power profile information stored in power profile register 124. Power control section 123 makes the first functional unit (memory module) operable, and operates the second functional unit (wireless communication module) 532 with transmission rate of 200 kbps, and wireless communication output power of 20 mW.

Parenthetically, functional unit of peripheral device in accordance with the third embodiment are a memory module and a wireless communication module, but instead, it may be a camera module that will be used by connecting to a USB or it may be other functional modules.

In peripheral device and control method thereof, main device and control method thereof, and program thereof in accordance with the third embodiment, peripheral device determines the power profile information when peripheral device is connected to main device, based on requested specifications. Instead, peripheral device may determine power profile information based on requested specifications when power of main device is turned on while peripheral device is connected, or may detect power which the main device can supply (for example, by monitoring the voltage of a battery) at regular time intervals, and determine power profile information based on this. It will do as well to redetermine power profile information when power which the main device can supply becomes a certain value or lower. It is useful in such cases as when main device is battery-driven.

Requested specifications of main device in accordance with the third embodiment are permissible range of power which the main device can supply to peripheral device, and permissible range of function which the main device demands to peripheral device. Instead, it will do as well to designate power which the main device can supply to peripheral device, and function which the main device demands to peripheral device. In this case, main device determines power profile information which is the same as or approximates to the requested specifications.

As described above, in regard to the third embodiment, by making the peripheral device select the most appropriate power profile information based on power profile information of peripheral device and requested specifications of main device, it becomes possible for the main device to control power of each peripheral device without information about functions of individual peripheral devices.

In addition, it became possible for the main device to control among arbitrary peripheral devices so as to make the peripheral device to exert the function which main device demands to peripheral device and also not to consume unnecessary power.

Parenthetically, in regard to the above-mentioned first embodiment through third embodiment, a case where there is an item that is relevant to power consumption level and an item that is relevant to the function of a plurality of functional units in the power profile information was described, however, there may be a case where power profile information relates only to power consumption, or a case where power profile information is relevant only to the functions of functional unit.

By loading a program which executes the control method of peripheral device in accordance with the first embodiment to the third embodiment, to a peripheral device through the intermediary of a medium or a communication channel, it enables the peripheral device to exert a similar function, and brings about a similar effect, as that of the first embodiment to the third embodiment.

As described in detail in each of the above embodiments, according to the present invention in regard to connection with an arbitrary peripheral device, the present invention can obtain an advantageous effect of realizing a peripheral device and control method thereof, a main device and control method thereof, and program thereof, wherein peripheral device makes use of functions necessary to the main device and also does not consume unnecessary power, by making the main device select the most appropriate power profile information based on power profile information of peripheral device.

According to the present invention, in regard to connection with an arbitrary peripheral device, the present invention can obtain an advantageous effect of realizing a peripheral device and control method thereof, a main device and control method thereof, and program thereof, wherein peripheral device makes use of functions necessary to the main device and also does not consume unnecessary power, by making the peripheral device select the most appropriate power profile information based on requested specifications of main device.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present invention is useful as a peripheral device and control method thereof, a main device and control method thereof, and program thereof, of a system in which the main device supplies power to the peripheral device.

The invention claimed is:

1. A peripheral device comprising:
a functional unit which carries out a function based on commands from a main device;
a power control section which controls power consumption of said functional unit;
a power profile information memory which stores a power profile information list that includes single or plural power profile information;
and an interface section which sends and receives said power profile information and commands relevant to the functional unit to and from said main device; wherein
said interface section sends said power profile information list to said main device in response to a demand from said main device;
and said power control section controls power consumption of said functional unit according to selected information of said power profile information list received from said main device.

2. The peripheral device in accordance with claim 1, wherein said power profile information includes at least one of: (1) a maximum output value of a power amplifier, and (2) a transmission rate of a wireless communication; and
said power control section controls power consumption of said functional unit in regard to an element of said power profile register.

3. A peripheral device comprising:
a functional unit which carries out a function based on commands from a main device;
a power profile register which stores power profile information;
a power control section which controls power consumption of said functional unit;
a power profile information memory which stores a power profile information list that includes single or plural power profile information;
and an interface section which sends and receives said power profile information and commands relevant to the functional unit to and from said main device;
wherein said interface section sends said power profile information list stored in said power profile information memory to said main device in response to a demand from said main device, and
according to selected information of said power profile information list received from said main device, said peripheral device stores corresponding power profile information from said power profile information memory, in a power profile register;
and said power control section deciphers said power profile information stored in said power profile register and controls power consumption of said functional unit based on said deciphered power profile information.

4. A peripheral device comprising:
a functional unit which carries out a function based on commands from a main device;
a power profile information memory which stores a power profile information list that includes single or plural power profile information;
an interface section which receives requested specifications from said main device, which includes a range designated by said main device or a range allowed by said main device;
a power profile judgment section which determines appropriate power profile information from the power profile information list stored in the power profile information memory based on the requested specifications;
a power profile register which stores said power profile information that is determined by said power profile judgment section;
and a power control section which controls power consumption of said functional unit;
wherein said interface section sends the requested specifications from said main device, to said power profile judgment section;
and said power control section deciphers said power profile information stored in said power profile register and controls power consumption of said functional unit based on said deciphered power profile information.

5. A peripheral device in accordance with claim 4, wherein said power profile judgment section changes a value of the power consumption included in said power profile information to be stored in power profile register based on a value of voltage sent from said main device.

6. A main device which demands a power profile information list from a peripheral device, wherein the power profile information list includes single or plural power profile information that is information for the peripheral device to control power, selects single power profile information which is appropriate for the main device from said power profile information list sent from said peripheral device, and sends the selected information of selected power profile information to said peripheral device.

7. A main device in accordance with claim 6, wherein various said power profile information is determined according to the value of power supply voltage.

8. The main device in accordance with claim 6, wherein said power profile information has at least one of a maximum output value of a power amplifier and a transmission rate of a wireless communication as an element.

9. A control method of a peripheral device comprising:
a sending step of sending a power profile information list which includes single or plural power profile information to a main device in response to a demand from said main device;
a receiving step of receiving the selected information of power profile information which is sent from said main device;
and a power controlling step of controlling power consumption of a functional unit according to the selected information of said power profile information.

10. A control method of peripheral device comprising:
a sending step of sending a power profile information list which includes single or plural power profile information to a main device in response to a demand from said main device;

a receiving step of receiving the selected information of power profile information which is sent from said main device; a storing step of extracting and storing said power profile information according to said selected information of power profile information from the power profile memory;

and a power controlling step of deciphering said power profile information and controlling power consumption of functional unit based on said deciphered power profile information.

11. A control method of peripheral device comprising:

a receiving step of receiving specifications which a main device designates;

a power profile judging step of determining power profile information that is appropriate to the specifications designated by said main device from a power profile information list which includes single or plural power profile information that is stored in a power profile information memory;

and a power control step of controlling power consumption of a functional unit based on said determined power profile information.

12. A control method of main device which demands a power profile information list from said peripheral device, wherein the power profile information list includes single or plural power profile information which is information for said peripheral device to control power, selects single power profile information which is appropriate for the main device from said power profile information list sent from said peripheral device, and sends the selected information of the selected power profile information to said peripheral device.

13. A computer readable medium encoded with software code capable of being executed by a computer to execute the control method of the peripheral device in accordance with claim 9.

* * * * *